United States Patent
Yan (10) Patent No.: US 10,191,969 B2
(45) Date of Patent: Jan. 29, 2019

(54) FILTERING ONLINE CONTENT USING A TAXONOMY OF OBJECTS

(71) Applicant: Facebook, Inc., Menlo Park, CA (US)

(72) Inventor: Jinghao Yan, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 247 days.

(21) Appl. No.: 15/354,734

(22) Filed: Nov. 17, 2016

(65) Prior Publication Data
US 2018/0137191 A1    May 17, 2018

(51) Int. Cl.
*G06F 17/30* (2006.01)

(52) U.S. Cl.
CPC .. *G06F 17/30598* (2013.01); *G06F 17/30507* (2013.01); *G06F 17/30554* (2013.01); *G06F 17/30867* (2013.01)

(58) Field of Classification Search
USPC ............................................ 707/733; 706/12
See application file for complete search history.

(56) References Cited

U.S. PATENT DOCUMENTS

2017/0017638 A1*    1/2017   Satyavarta ............ G06F 17/278

\* cited by examiner

*Primary Examiner* — Hung T Vy
(74) *Attorney, Agent, or Firm* — Fenwick & West LLP (57) ABSTRACT

An online system generates a taxonomy to classify objects that resemble each other. To compare different objects against each other, the online system generates canonical form data structures to represent the objects. The online system uses the canonical form data structures to standardize unstructured information about objects, for example, objects received from different sources of information to generate the taxonomy. The online system can determine a level of resemblance between objects based on parameter values of the canonical form data structures. The online system uses the taxonomy to exclude content items that are unlikely to be of interest to a user of the online system. The taxonomy may be represented by a graph data structure including nodes connected by edges.

20 Claims, 8 Drawing Sheets

Canonical Form Data Structure 320
Basketball Shoes

| Canonical Object Type = Athletic Shoe | Acquisition Rate = 2 years | Object Value = $80 | Object Color = Red |

Canonical Form Data Structure 330
Soccer Cleats

| Canonical Object Type = Athletic Shoe | Acquisition Rate = 2 years | Object Value = $50 | Object Color = Green |

Canonical Form Data Structure 340
King Size Mattress

| Canonical Object Type = Mattress | Acquisition Rate = 5 years | Object Value = $600 | Object Color = White |

Canonical Form Data Structure 350
Queen Size Mattress

| Canonical Object Type = Mattress | Acquisition Rate = 5 years | Object Value = $500 | Object Color = Gray |

FIG. 6

FILTERING ONLINE CONTENT USING A TAXONOMY OF OBJECTS

BACKGROUND

1. Field of Art

This disclosure generally relates to classifying objects using canonical form data structures by online systems and to filtering online content items using a taxonomy of objects.

2. Description of the Related Art

An online system, such as a social networking system, typically has access to large amounts of information describing actions performed by users that may be of interest to other users of the online system. The online system allows its users to connect to and to communicate with other users. Users may create user profiles on the online system that are tied to their identities and include information about the users, such as interests and demographic information. Because of the increasing popularity of these types of online systems and the increasing amount of user-specific information maintained by such online systems, an online system provides an ideal forum to increase awareness about items to online system users. The online system further sends content items to users such as news feed stories including photos, videos, and the like.

Online systems prefer to deliver content items to users that are likely to be of interest to the users. By sending content items that are unlikely to be of interest to users, an online system wastes resources, for example, computing resources and networking resources and provides poor user experience.

SUMMARY

An online system filters content items delivered to users based on a taxonomy of objects associated with the content items. The online system generates a taxonomy classifying the objects based on their similarity with each other. To compare different objects against each other, the online system generates canonical form data structures to represent the objects. The canonical form data structures include parameters that the online system uses as a standard of comparison. For example, a first object is a pair of running shoes and a second object is a pair of basketball shoes. One of the parameters indicates that both of the objects are athletic shoes. Thus, the taxonomy classifies both objects under a subcategory of athletic shoe type objects. The online system uses the canonical form data structures to standardize unstructured information about objects received from different sources of information. For instance, a first third party website includes a description of an object representing the pair of running shoes. A second third party website includes a description of the same object in a different format or using different terminology. The online system classifies both the objects under the same category and standardizes their representation. In an embodiment, the online system determines a level of resemblance between objects by generating a score for each pair of objects, for example, a Jaccard index based on the parameter values of the canonical form data structures.

The online system uses the taxonomy to exclude content items that are unlikely to be of interest to a user of the online system. In an example use case, the online system receives information indicating that the user acquired a pair of running shoes. The user is unlikely to acquire another pair of running shoes until another year or two passes. Thus, in the near future, the user will probably not be interested in viewing more content items describing other running shoes. Since the taxonomy indicates resemblances between objects, the online system can determine which objects are similar to the running shoes that the user acquired. The online system removes content items describing those similar objects from consideration to be displayed to the user. For example, the user is excluded from a group of targeted users for a content item about running shoes if the content item is no longer relevant for that user. Thus, the content provider does not waste resources providing its content item to that user, and focuses on targeting only the group of users for which it is still relevant.

In some embodiments, the taxonomy is represented by a graph data structure including nodes connected by edges. Nodes of objects that resemble each other are connected to nodes of the same category or subcategory of objects, for example, athletic shoe type objects. By representing the objects in a graph, the online system can efficiently determine subsets of similar objects from the total set of objects classified by the taxonomy. The disclosed embodiments beneficially allow the online system to increase the efficiency of computation of the process of filtering and identifying which objects in the taxonomy most closely resemble an object previously acquired by a user, thereby saving computational resources required.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Embodiments of the invention filter content items delivered to users of an online system based on a taxonomy of objects. In an example use case, the online system delivers a content item describing a pair of running shoes to a target user. The online system receives information indicating that the user acquired the running shoes. When selecting subsequent content items to display to the target user, it is desirable and challenging to determine a method for excluding content items describing objects similar to the running shoes because the target user is unlikely to be interested in acquiring another pair of running shoes until another year or two has passed. Embodiments of the invention include a taxonomy to classify objects by determining resemblances between different objects. The online system uses the taxonomy to identify other objects similar to an object that the target user previously acquired. Objects include products (e.g., tangible objects) or services (e.g., intangible objects) available via third party systems 120 or messages promoted by third party systems 120 (e.g., messages about a charitable cause). The online system uses the taxonomy to exclude content items describing objects similar to the running shoes from delivery to the user for a period of time. As one example, a user may be in a target group of users for a content item from a furniture store providing an offer associated with a sofa. If the online system detects that the user has just purchased a new loveseat on a website associated with another furniture store, the online system will determine that the sofa and the loveseat are related items in the taxonomy and will exclude the user (post purchase exclusion) from the target group for the sofa since the user is unlikely to purchase a second similar piece of furniture.

Figure 1:
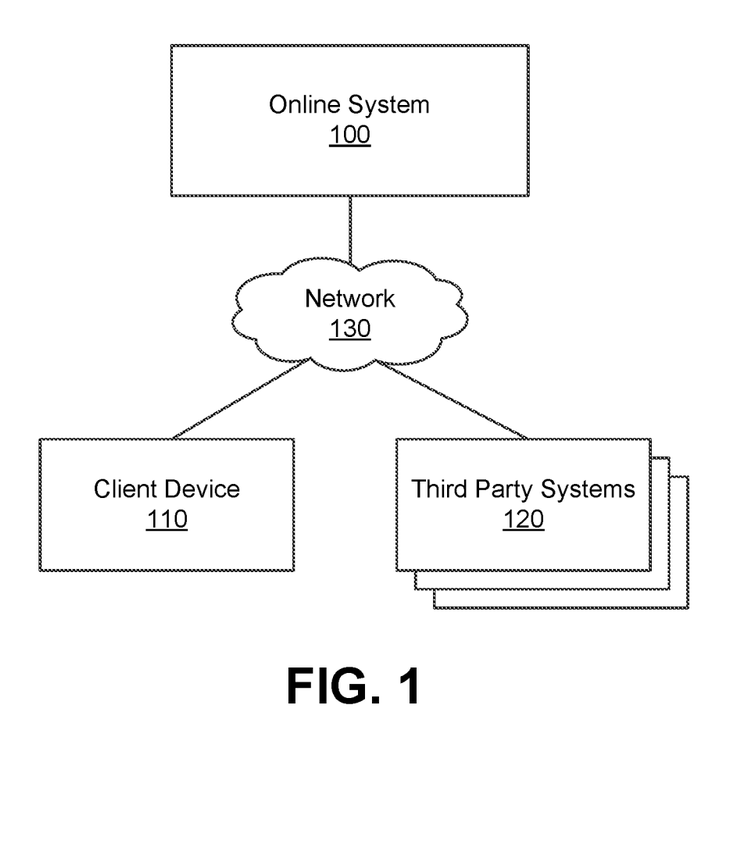
FIG. 1 is a diagram of a system environment for classifying objects according to one embodiment.

FIG. 1 is a diagram of a system environment for classifying objects according to one embodiment. The system architecture includes an online system 100, a client device 110, and one or more third party systems 120. The various systems shown in FIG. 1 are connected to each other via a network 130. In other embodiments, different and/or additional entities can be included in the system architecture.

The online system 100 includes a computing environment that allows users of the online system 100 to communicate or otherwise interact with each other and access content. The online system 100 receives information about the users, for example, user profile information and information about actions performed by users on the online system 100 or a third party system 120. The online system 100 also receives information from third party systems 120. Based on the received information, the online system 100 determines certain objects that a target user acquired. The online system 100 uses a taxonomy of objects to determine other objects similar to the objects that the target user acquired. The online system 100 filters content items to be presented to the target user based on resemblances between different objects in the taxonomy. The content items may encourage the target user to take action, e.g., acquire another type of object from a third party system 120.

The client device 110 is a computing device capable of receiving user input as well as transmitting and/or receiving data via the network 130. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 130. In one embodiment, a client device 110 executes an application allowing a user of the client device 110 to interact with the online system 100 or a third party system 120. For example, a client device 110 executes a browser application to enable interaction between the client device 110 and the online system 100 via the network 130. In another embodiment, a client device 110 interacts with the online system 100 through an application programming interface (API) running on a native operating system of the client device 110, such as IOS® or ANDROID™.

In one embodiment, a third party system 120 is an application provider communicating information describing applications for execution by a client device 110 or communicating data to client devices 110 for use by an application executing on the client device 110. In other embodiments, a third party system 120 provides content or other information for presentation via a client device 110. Each third party system 120 is associated with a server outside of the domain of the online system 100. In one embodiment, the third party system 120 communicates content (e.g., a website or HTML code) from a server of the third party system 120 to a server of the online system 100. The content may be created by the entity that owns the third party system 120. Such an entity may be a company or other type of organization offering a product (e.g., a tangible object or an intangible service), or message that the company wishes to promote.

The network 130 includes any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

II. Example System Architecture of Online System

Figure 2:
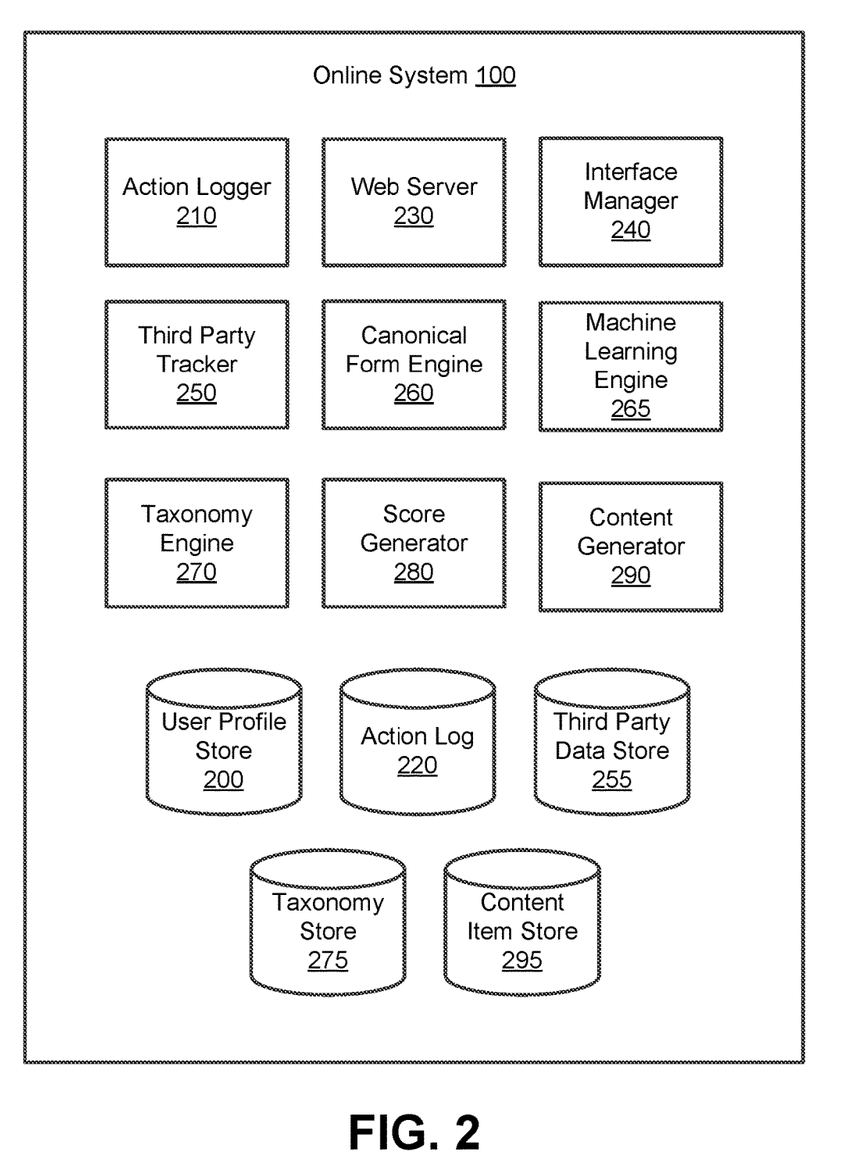
FIG. 2 is a block diagram illustrating the architecture of an online system for classifying objects according to one embodiment.

FIG. 2 is a block diagram illustrating the architecture of the online system 100 for predicting user actions according to one embodiment. The online system 100 includes a user profile store 200, action logger 210, action log 220, web server 230, interface manager 240, third party tracker 250, third party data store 255, canonical form engine 260, machine learning engine 265, taxonomy engine 270, taxonomy store 275, score generator 280, content generator 290, and content item store 295. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

The user profile store 200 stores user profiles associated with users of the online system 100. A user profile includes declarative information about the user that was explicitly shared by the user and may also include profile information inferred by the online system 100. In one embodiment, a user profile includes multiple data fields, each describing one or more attributes of the corresponding user of the online system 100. Examples of information stored in a user profile include biographic, demographic, and other types of descriptive information, such as work experience, educational history, gender, hobbies or preferences, location and the like.

A user profile may also store other information provided by the user, for example, images or videos. In certain embodiments, images of users may be tagged with identification information of users of the online system 100 displayed in an image. A user profile in the user profile store 200 may also maintain references to actions by the corresponding user performed on the online system 100. The user profile store 200 further stores data describing one or more relationships between different users and allows users to specify their relationships with other users. For example, these user-defined relationships allow users to generate relationships with other users that parallel the user's real-life relationships, such as friends, co-workers, partners, and the like.

The user profile store 200 can store user profiles associated with individuals, as well as user profiles associated with entities such as businesses or organizations, e.g., that own a third party system 120. This allows an entity to establish a presence on the online system 100 for connecting and exchanging content with other users of the online system 100. The entity may post information about itself, about items associated with the entity, for example, products offered by the entity, or provide other information to users of the online system 100 using a brand page associated with the entity's user profile. Users of the online system 100 may connect to the brand page to receive information posted to the brand page or to receive information from the brand page. A user profile associated with the brand page may include information about the entity itself, providing users with background or informational data about the entity.

The action logger 210 receives communications about user actions internal to and/or external to the online system 100, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 100 to track user actions on the online system 100, as well as actions on third party systems 120 that communicate information to the online system 100. Users may interact with various objects on the online system 100, and the action logger 210 stores information describing these interactions in the action log 220. Examples of interactions with objects include: viewing products on a brand page, commenting on posts, sharing links, and checking-in to physical locations via a mobile device, accessing content items, and any other interactions. Additional examples of interactions with objects on the online system 100 that are included in the action log 220 include: acquiring a product from a third party system 120, commenting on a photo album, communicating with a user, establishing a connection with an object, joining an event to a calendar, joining a group, creating an event, authorizing an application, using an application, expressing a preference for an object ("liking" the object) and engaging in a transaction.

Additionally, the action log 220 may record a user's interactions with content (e.g., sponsored or non-sponsored content) on the online system 100 as well as with other applications operating on the online system 100. In some embodiments, data from the action log 220 is used to infer interests or preferences of a user, augmenting the interests included in the user's user profile and allowing a more complete understanding of user preferences. The action log 220 can record information about client devices 110 that a user uses to interact with the online system 100. For example, the action log 220 records whether the user used a laptop computer or smartphone client device to interact with the online system 100. Further, the action log 220 may include information about the types of client devices 110, e.g., smartphone running an IOS® or ANDROID™ operating system.

The action log 220 may also store user actions performed on a third party system 120, such as an external website, and communicated to the online system 100. For example, the external website may recognize a user of an online system 100 through a social plug-in enabling the external website to identify the user of the online system 100. Since users of the online system 100 are uniquely identifiable, external websites may communicate information about a user's actions outside of the online system 100 to the online system 100 for association with the user. Hence, the action log 220 can record information about actions that users perform on a third party system 120 including webpage viewing histories, content that were engaged, acquisitions made, and other patterns from past actions. The action log 220 can also store information about user actions performed on a third party system 120 received from the third party tracker 250, which is further described below.

The web server 230 links the online system 100 via the network 130 to the client devices 110. The web server 230 serves web pages, as well as other web-related content, such as JAVA®, FLASH®, XML and so forth. The web server 230 may receive and route messages between the online system 100 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the user profile store 200. Additionally, the web server 230 may provide application programming interface (API) functionality to send data directly to native client device operating systems, such as IOS®, ANDROID™, WEBOS® or RIM®.

The interface manager 240 generates graphical user interfaces presenting information from the online system 100. For example, the graphical user interfaces display content items, e.g., notifications, information about products, services, or messages, news feed stories, brand pages, content, etc., on client devices 110 of users of the online system 100. The content items may be based on information from the user profile store 200 or the action log 220, or based on a user's predicted actions. The user may provide information to the online system 100 via the interface manager 240, e.g., interactions performed by users with content items on the online system 100. Similarly, the third party system 120 may provide information to the online system 100 via the interface manager 240, e.g., information about items such as products.

The third party tracker 250 receives third party information from third party systems 120 and stores the received information in the third party data store 255, e.g., a computer database. The third party tracker 250 can periodically send a request for third party information to a third party system 120. The third party system 120 provides the third party information in response to receiving the request. Third party systems 120 can also provide third party information proactively to the third party tracker 250 without requiring a request. For example, a third party system 120 automatically provides third party information in response to a user acquiring a certain object from the third party system 120. As another example, a third party system 120 automatically provides third party information on a regular basis to the third party tracker 250, e.g., once every day, week, or month.

In one embodiment, the third party tracker 250 receives information from third party systems 120 using pixel tracking. The online system 100 or another system provides a pixel to a third party system 120 to be included in a user interface associated with the third party system 120. The third party system 120 provides third party information to the third party tracker 250 in response to a user of the online system 100 viewing the pixel of the user interface. For example, the pixel is included in a user interface displaying a website of the third party system 120, e.g., a website for a checkout process for acquiring an object (e.g., a product or service available via the third party system 120). The website may include information about the object such as the name, description, inventory, availability, price, and the like. When the client device 110 of the user displays the pixel of the website on the display screen of the client device, the client device 110 executes code associated with the pixel that causes the client device 110 to interact with the online system 100. The interaction of the client device 110 with the online system 100 provides information describing the user interaction with the website to the online system 100. The information describing the user interaction may include third party information indicating that the user viewed the website. Additionally, the information describing the user interaction may describe the object. In some embodiments, the third party tracker 250 can provide multiple pixels to the third party system 120. The multiple pixels can each be associated with the same object or with a different object.

The canonical form engine 260 generates a canonical form data structure representation of objects in the online system 100. The online system 100 uses the canonical form data structures for comparing different objects, e.g., different types of shoes and furniture. The canonical form data structures include parameters that describe the objects, e.g., a category, a type, size, color, or value of an object. In one embodiment, the parameters are based on information provided by a third party system 120. For instance, the third party system 120 categorizes clothing type objects under a clothing object category and furniture type objects under a furniture object category. Thus, the parameters include an object category parameter. Alternatively, the parameters may be determined by the online system 100.

In some embodiments, the machine learning engine 265 uses machine learning techniques to train one or more models for determining parameters for the canonical form data structures. Machine learning techniques include, for example, natural language processing, linear regression, decision trees, support vector machines, classifiers (e.g., a Naive Bayes classifier), fuzzy matching, and gradient boosting. The machine learning engine 265 trains the models using feature vectors including information from the online system 100, e.g., information about objects available via third party systems 120 from the third party data store 255. The information may be a string data type representation of an object description from a website of the third party systems 120. Based on the training, the models determine parameters that classify the objects. In other words, the trained models can predict parameters of the objects such as the category, type, size, color, or value. For example, a model determines that object value is a parameter because all of the objects have an associated value (e.g., 50 U.S. Dollars, 40 British Pounds, or 300 Chinese Yuan). The value of an object is an amount of compensation that a user must provide to a third party system 120 to acquire the object from the third party system 120. In some embodiments, the models translate non-English text from an object description into English to determine the parameters.

The taxonomy engine 270 generates a taxonomy of objects and stores the taxonomy in the taxonomy store 275, e.g., a computer database. In one embodiment, the taxonomy is represented in the online system 100 by a graph data structure. The graph includes nodes connected to other nodes by edges. The nodes represent objects (e.g., running shoe or basketball shoe) or categories of objects (e.g., clothing or furniture). In an embodiment, the graph data structure represents a hierarchy of categories that connects nodes representing categories of objects with subcategories. For example, a node representing a clothing category is connected to nodes representing shoes and shirts as subcategories of the clothing category. The taxonomy engine 270 connects nodes by edges based on parameters in the canonical form data structures of objects represented by the nodes. For example, the canonical form data structures of a pair of running shoes and a pair of basketball shoes indicate that both objects have a canonical object type of "athletic shoe." Thus, the taxonomy engine 270 uses edges to connect the nodes representing the running shoes and the basketball shoes to a node representing an "athletic shoe" category (or subcategory). Further, the taxonomy engine 270 may connect the nodes representing the running shoes and the basketball shoes to each other using another edge. In other embodiments, the taxonomy is represented by different types of data structures, e.g., arrays, linked lists, or trees.

The score generator 280 uses the canonical form data structures to generate scores (also referred to as resemblance scores) indicating a level of resemblance or similarity between two or more objects based on the taxonomy. The score generator 280 generates the scores based on commonalities between parameters of the canonical form data structures of the objects. For example, the score generator 280 generates a greater score, indicating a high level of resemblance between two objects, if the canonical form data structures of the two objects have several parameters in common (e.g., same range of object value and same canonical object type). In contrast, the score generator 280 generates a lower score if few or none of the parameters match.

The content generator 290 generates content items for presentation to users of the online system 100. The content generator 290 can analyze information stored in the user profile store 200 or action log 220 to identify information useful for generating content items. The content generator 290 may also obtain information from other run time modules that implement functionality for performing different types of actions. For example, if a user views a brand page of a third party system 120, the module executing the code for displaying the brand page to the user informs the content generator 290 of the action so that the content generator 290 can generate a content item describing the action. Further, the content generator 290 can generate content items based on information provided by a third party system 120, e.g., information about items such as images and prices of objects available via the third party system 120. In an embodiment, the content generator 290 receives content items from a third party system. A content item may be a sponsored content item. Accordingly, the third party associated with the third party system provides remuneration to the online system 100 for delivering or displaying the content items to users of the online system 100.

III. Example Canonical Form Data Structure

Figure 3A:
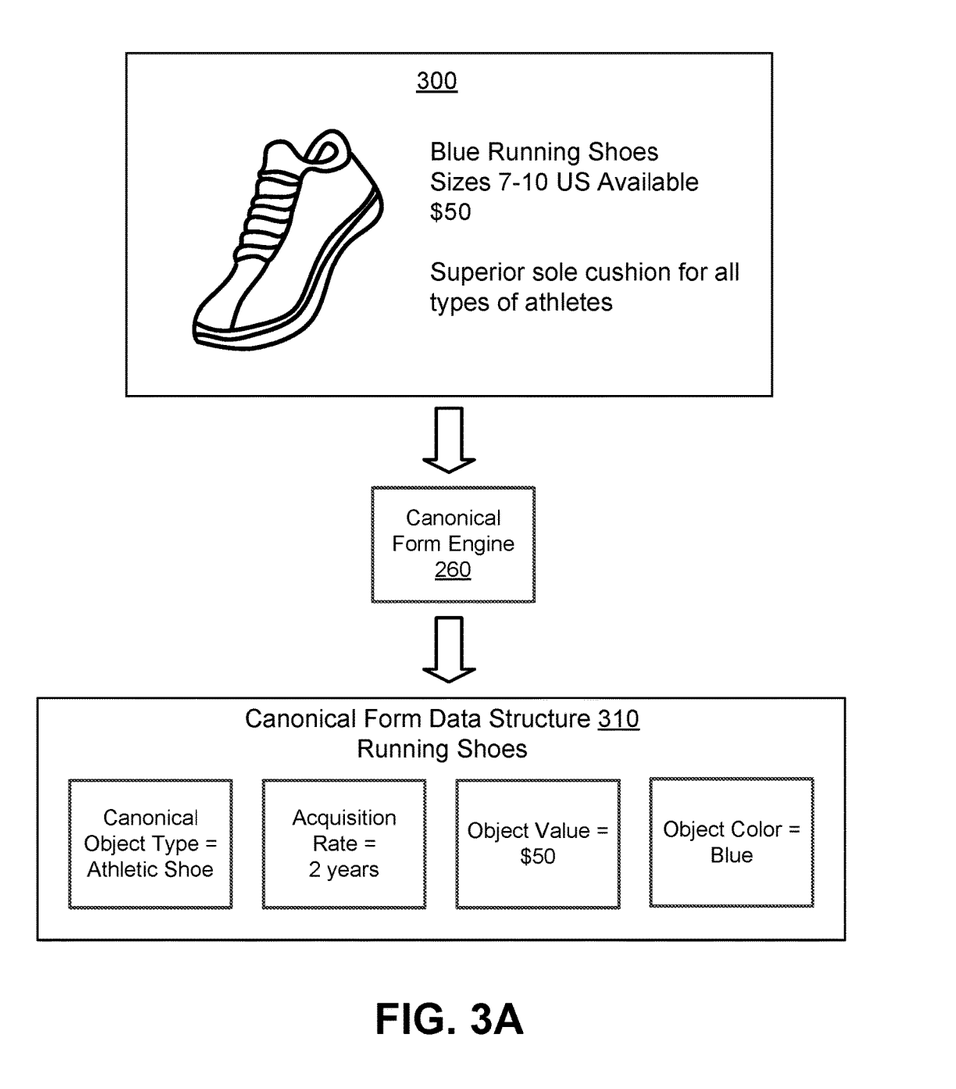
FIG. 3A is a diagram of generating a canonical form data structure according to one embodiment.

FIG. 3A is a diagram of generating a canonical form data structure according to one embodiment. The third party tracker 250 receives an object description 300 for an object, e.g., a pair of running shoes, from a third party system 120. The object description 300 includes an image of the running shoes and text describing the running shoes. The canonical form engine 260 and/or models trained by the machine learning engine 265 analyze the text to determine values for the parameters of a canonical form data structure 310 of the running shoes. For example, the canonical form engine 260 determines that the canonical object type is "athletic shoe" because running shoes are a type of shoes that people wear to exercise and/or because the text includes the word "athletes." Additionally, the canonical form engine 260 determines that the object value and object color are "$50" and "Blue," respectively, based on the text (specifically "$50" and "blue") in the object description 300. The canonical form engine 260 uses information from other modules of the online system 100 to determine the value for the acquisition rate parameter. In an embodiment, the canonical form engine 260 determines the acquisition rate of a type of object based on historical information, for example, data stored in action log 220 that represents events representing acquisition of objects of that type by a user over time. The canonical form engine 260 determines the acquisition rate for a user based on the size of the time interval between two subsequent events, each event representing an acquisition of a matching object of a particular type. The canonical form engine 260 determines the acquisition rate for objects of a type by aggregating acquisition rates for objects of that type for a population of users. For example, the action log 220 or third party data store 255 includes information indicating that users of the online system 100 acquire a new pair of running shoes once every two years on average. Thus, the canonical form engine 260 determines that the acquisition rate for the running shoes is once per two years. In some embodiments, the canonical form engine 260 also analyzes media (e.g., images or videos) to determine parameters, e.g., the canonical form engine 260 uses image processing techniques to determine the color of an object shown in an image. In some embodiments, the object descriptions include one or more manufacture part numbers (or serial numbers, product identification numbers, stock keeping unit code, and the like) and a parameter of the canonical form data structure is "manufacture part number."

Figure 3B:
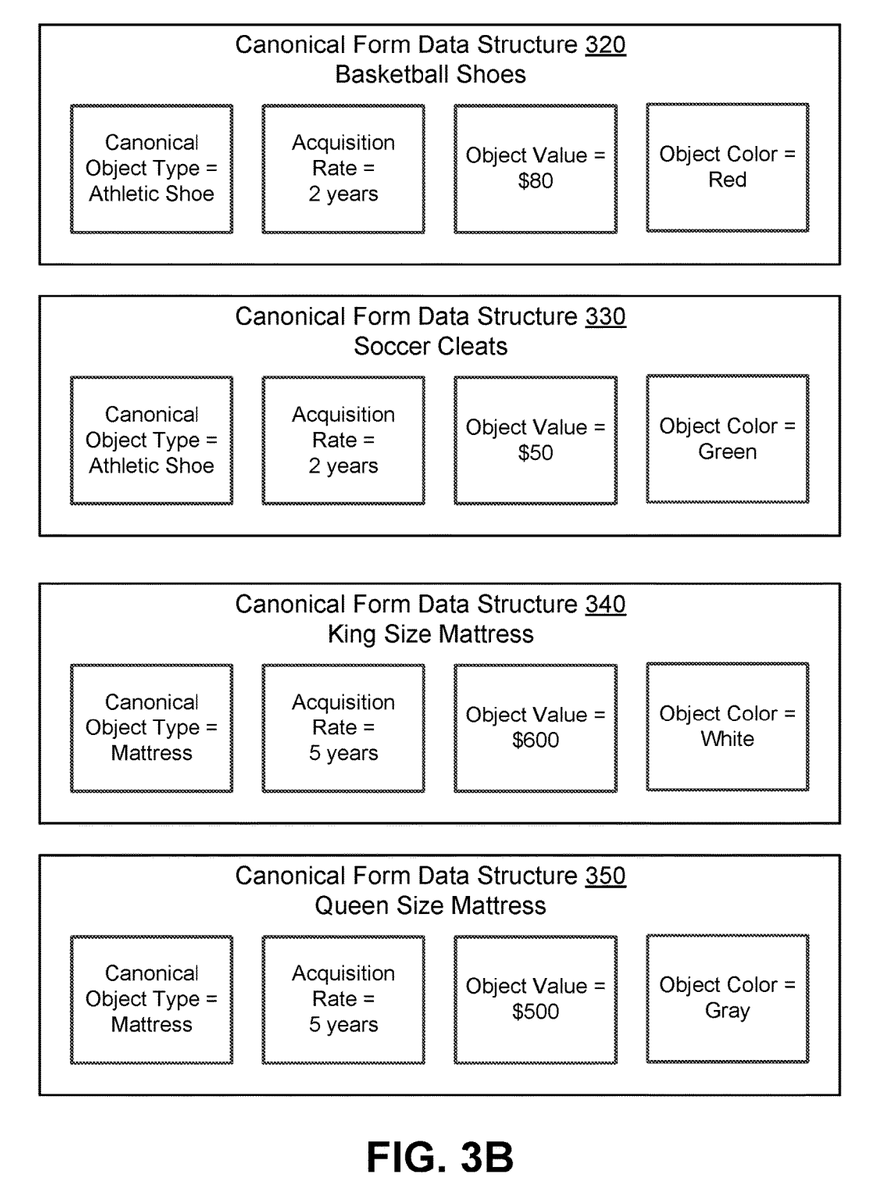
FIG. 3B is a diagram of canonical form data structures according to one embodiment.

FIG. 3B is a diagram of canonical form data structures according to one embodiment. Each of the canonical form data structures 320, 330, 340, and 350 have the same parameters as the canonical form data structure 310 for the running shoes shown in FIG. 3A. However, some of the values of the parameters differ based on the different objects. In particular, the canonical form data structures 320 and 330 for the basketball shoes and the soccer cleats, respectively, each have a canonical object type of "athletic shoe" and an acquisition rate of once per "2 years." The object value of the basketball shoes is "$80," while the object value of the soccer cleats is "$50." Further, the object color of the basketball shoes is "red," while the object color of the soccer cleats is "green." The canonical form data structures 340 and 350 for the king size mattress and the queen size mattress, respectively, each have a canonical object type of "mattress" and an acquisition rate of once per "5 years." The object value of the king size mattress is "$600," while the object value of the queen size mattress is "$500." Further, the object color of the king size mattress is "white," while the object color of the queen size mattress is "gray."

IV. Example Taxonomy of Objects

Figure 4:
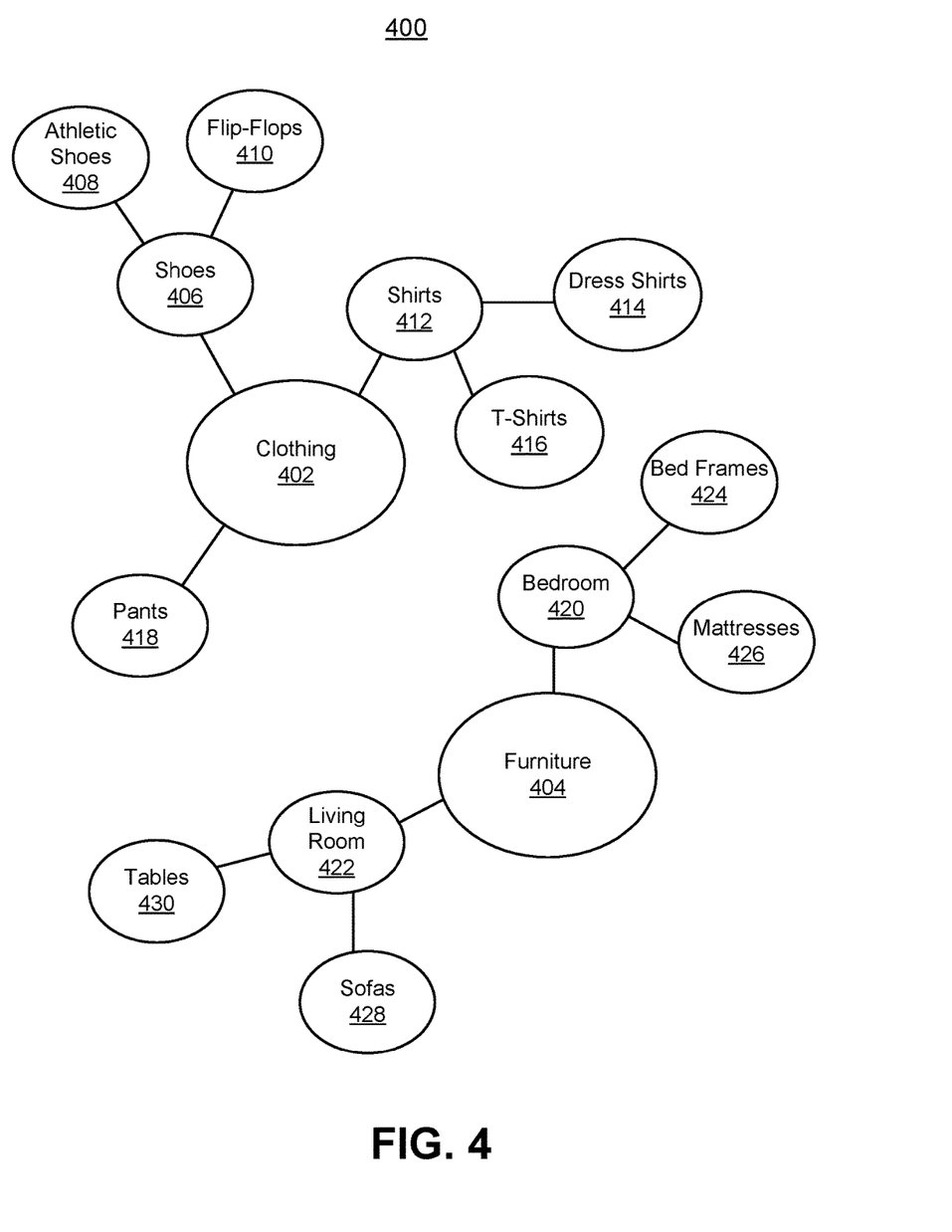
FIG. 4 is a diagram of a taxonomy of objects according to one embodiment.

FIG. 4 is a diagram of a taxonomy 400 of objects according to one embodiment. The taxonomy engine 270 generates the taxonomy 400 shown in FIG. 4, which is represented by a graph data structure and includes the nodes for the categories clothing 402 and furniture 404. Nodes for categories are not necessarily connected to each other. The clothing 402 category node is connected to nodes for the shoes 406, shirts 412, and pants 418 subcategories. The shoes 406 subcategory node is connected to nodes for the athletic shoes 408 and flip-flops 410 subcategories. The shirts 412 category is connected to nodes for the dress shirts 414 and T-shirts 416 subcategories.

The furniture 404 category node is connected to nodes for the bedroom 420 and living room 422 subcategory nodes. The bedroom 420 subcategory node is connected to nodes for the bed frames 424 and mattresses 426 subcategories. The living room 422 subcategory node is connected to nodes for the sofas 428 and tables 430 subcategory nodes.

Though not shown in FIG. 4, the taxonomy 400 also includes nodes representing canonical form data structures of objects that are classified by the taxonomy 400. In some embodiments, each edge has an associated weight that indicates a level of similarity between the two connected nodes. The taxonomy engine 270 may determine the weights based on information about objects received from third party systems 120. For example, if the online system 100 receives information about more shoe type objects compared to pants type objects, the taxonomy engine 270 determines a greater weight for the edge connecting the shoes 406 and clothing 402 nodes than for the edge connecting the pants 418 and clothing 402 nodes. In practice, the taxonomy may include hundreds, thousands, or more different categories and/or subcategories, and thousands, tens of thousands, or more canonical form data structures of different objects.

V. Filtering Objects and Content Items

Figure 5A:
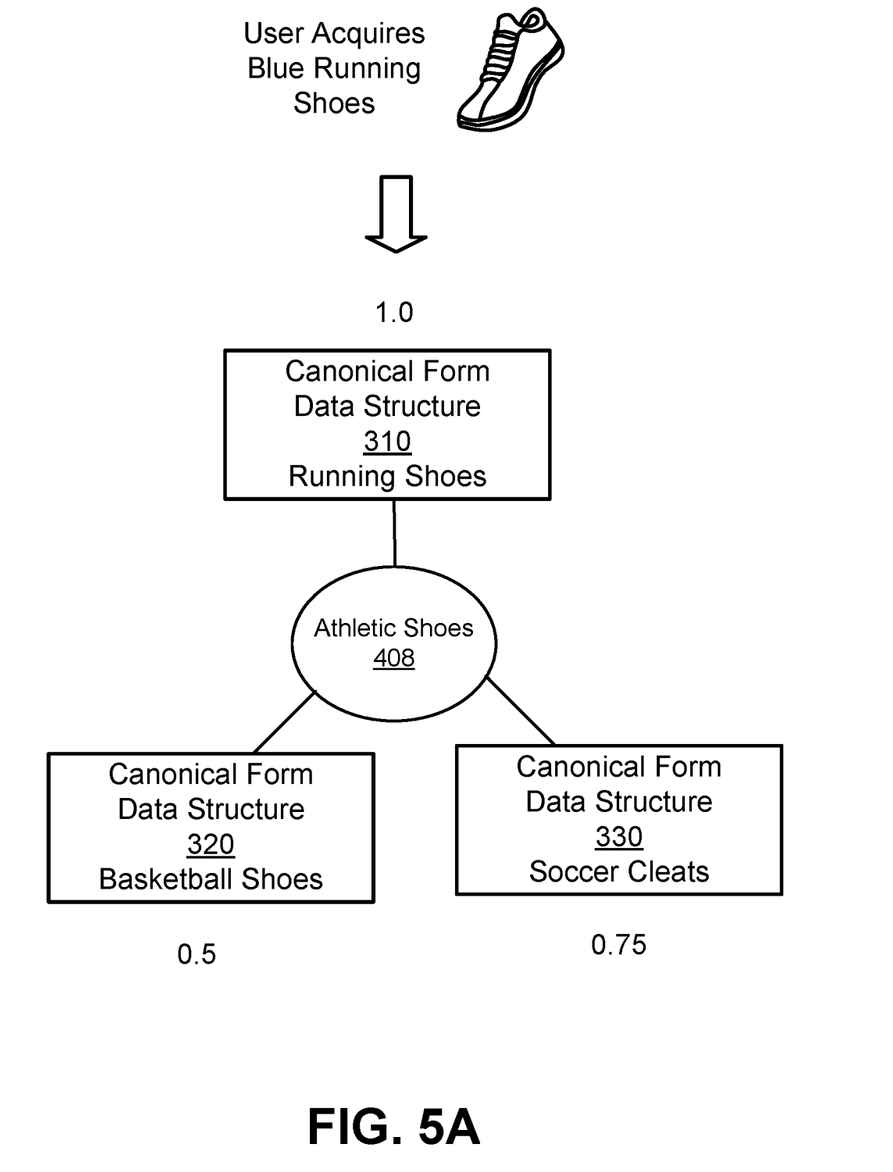
FIG. 5A is a diagram of filtering objects of a taxonomy according to one embodiment.

FIG. 5A is a diagram of filtering objects of the taxonomy 400 according to one embodiment. In an example use case, the third party tracker 250 receives information from a third party system 120 indicating that a target user acquired a pair of blue running shoes corresponding to the canonical form data structure 310. The taxonomy engine 270 filters the nodes of the taxonomy 400 by excluding nodes that are not similar to the object represented by the canonical form data structure 310. In particular, the taxonomy engine 270 excludes all nodes except for the nodes of canonical form data structures connected (e.g., directly or indirectly) to the athletic shoes 408 subcategory node because the canonical form data structure 310 is also connected to the athletic shoes 408 subcategory node. Thus, the taxonomy engine 270 selects a set including nodes for the canonical form data structures 310, 320, and 330 based on the filtering. The score generator 280 generates a score for each canonical form data structure of the set indicating a level of resemblance between the corresponding object and the blue running shoes.

In some embodiments, the scores generated by the score generator 280 are Jaccard indexes (also known as Jaccard similarity coefficients), which is a measure of the similarity between two sample sets. Alternatively, the scores may be Jaccard distances, which is a measure of the dissimilarity between two sample sets. The sample sets are the parameters of the canonical form data structures. The Jaccard index is greater if the canonical form data structures of two objects have several parameters in common. The Jaccard index and Jaccard distances are also normalized by the total number of parameters in the canonical form data structures.

In the example shown in FIG. 5A, the Jaccard index type scores for the canonical form data structures 310, 320, and 330 are 1.0, 0.5, and 0.75, respectively, based on the values of the parameters of the canonical form data structures 310, 320, and 330 shown in FIGS. 3A-B. In particular, the canonical form data structure 320 includes two parameters with the same values ("athletic shoe" for canonical object type and once per "2 years" for acquisition rate) as the canonical form data structure 310, and two parameters with different values ("$80" for object value and "red" for object color). Thus, the score for the canonical form data structure 320 is 2/(2+2)=0.5. The canonical form data structure 330 includes three parameters with the same values ("athletic shoe" for canonical object type, once per "2 years" for acquisition rate, and "$50" for object value) as the canonical form data structure 310, and one parameter with different values ("green" for object color). Thus, the score for the canonical form data structure 330 is 3/(3+1)=0.75. The score for the canonical form data structure 310 is 1.0 because the pair of blue running shoes is represented by the canonical form data structure 310.

Figure 5B:
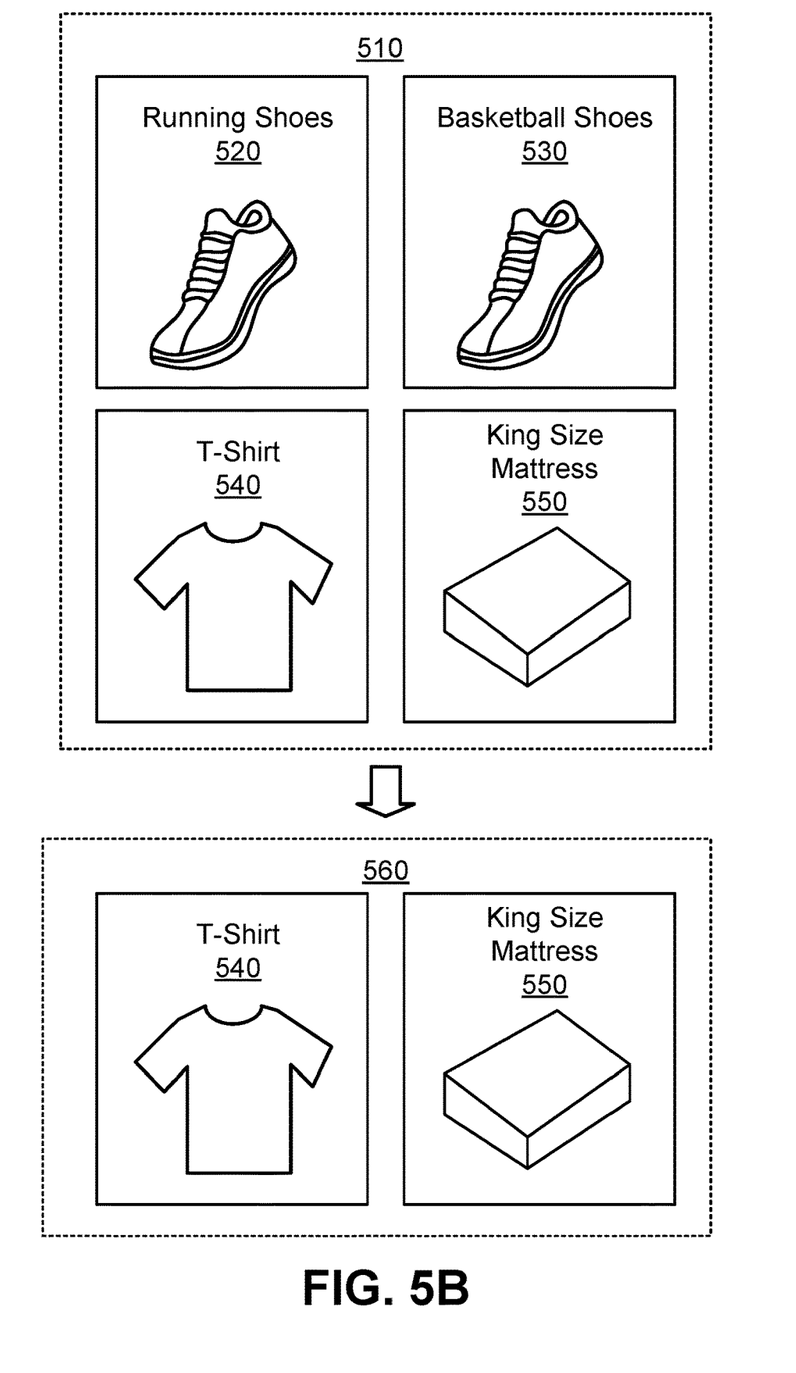
FIG. 5B is a diagram of filtering content items using a taxonomy of objects according to one embodiment.

FIG. 5B is a diagram of filtering content items using the taxonomy 400 of objects according to one embodiment. Following in the same example use case in FIG. 5A, the content generator 290 receives a set 510 of content items that may be selected to be presented for display to the target user who acquired the blue running shoes. The set 510 includes content item 520 describing a pair of running shoes (represented by the canonical form data structure 310), content item 530 describing a pair of basketball shoes (represented by the canonical form data structure 320), content item 540 describing a T-shirt, and content item 550 describing a king size mattress. The content generator 290 removes one or more content items from the set 510 if any of the scores generated by the score generator 280 are greater than a threshold value. For example, if the threshold value is 0.3, the content generator 290 removes the content item 520 (corresponding to the canonical form data structure 310 with a score of 1.0) and the content item 530 (corresponding to the canonical form data structure 320 with a score of 0.5) from the set 510. The content generator 290 selects a content item from the remaining set 560 of content items for display to the target user on a client device 110. In some embodiments, the threshold value is adjustable, e.g., based on a rate at which a user of the online system 100 interacts with content items or a rate at which the user acquires objects of a particular object type associated with the selected content item via third party systems 120.

In some embodiments, the content generator 290 removes content items from the set 510 based on information from the action logger 210 or action log 220. For example, the content generator 290 previously presented a content item describing a king size mattress to a user. The action logger 210 records that the user closed (e.g., by clicking an "X" icon or button associated with the content item) or did not view the content item, e.g., because the user is a college student living in a dormitory and does not need a king size mattress. Thus, in a subsequent content item selection process, the content generator 290 removes the content item 550 from the set 510 because the user is unlikely to be interested in acquiring a king size mattress.

In embodiments where the canonical form data structures include the acquisition rate parameter, the content generator 290 may stop excluding certain content items from the set 510 after a period of time has passed. For example, the acquisition rate of the running shoes is once per two years. After two years has passed, the user is likely to be interested in acquiring a new pair of running shoes again. Thus, the content generator 290 begins to include content items describing running shoes for consideration to be selected for display to the user. In some embodiments, the content generator 290 begins to include these content items starting from a duration preceding the end of the period of time. For instance, the content generator 290 begins displaying content items describing running shoes 18 months after the user previously acquired a pair of running shoes (e.g., 6 months before the end of the two year period of time) in anticipation that the user will soon want to acquire a new pair.

In embodiments where the acquisition rate information is not explicitly available to the online system 100, the online system 100 may infer the acquisition rate of an object based on other types of information. For example, based on information from the action log 220 or third party data store 255, the online system 100 determines that objects that have a greater value (e.g., price) have less frequent acquisition rates than objects that have less value. For instance, bed mattresses are more expensive than shoes, and users acquire shoes more frequently than bed mattresses.

VI. Example Process Flows

Figure 6:
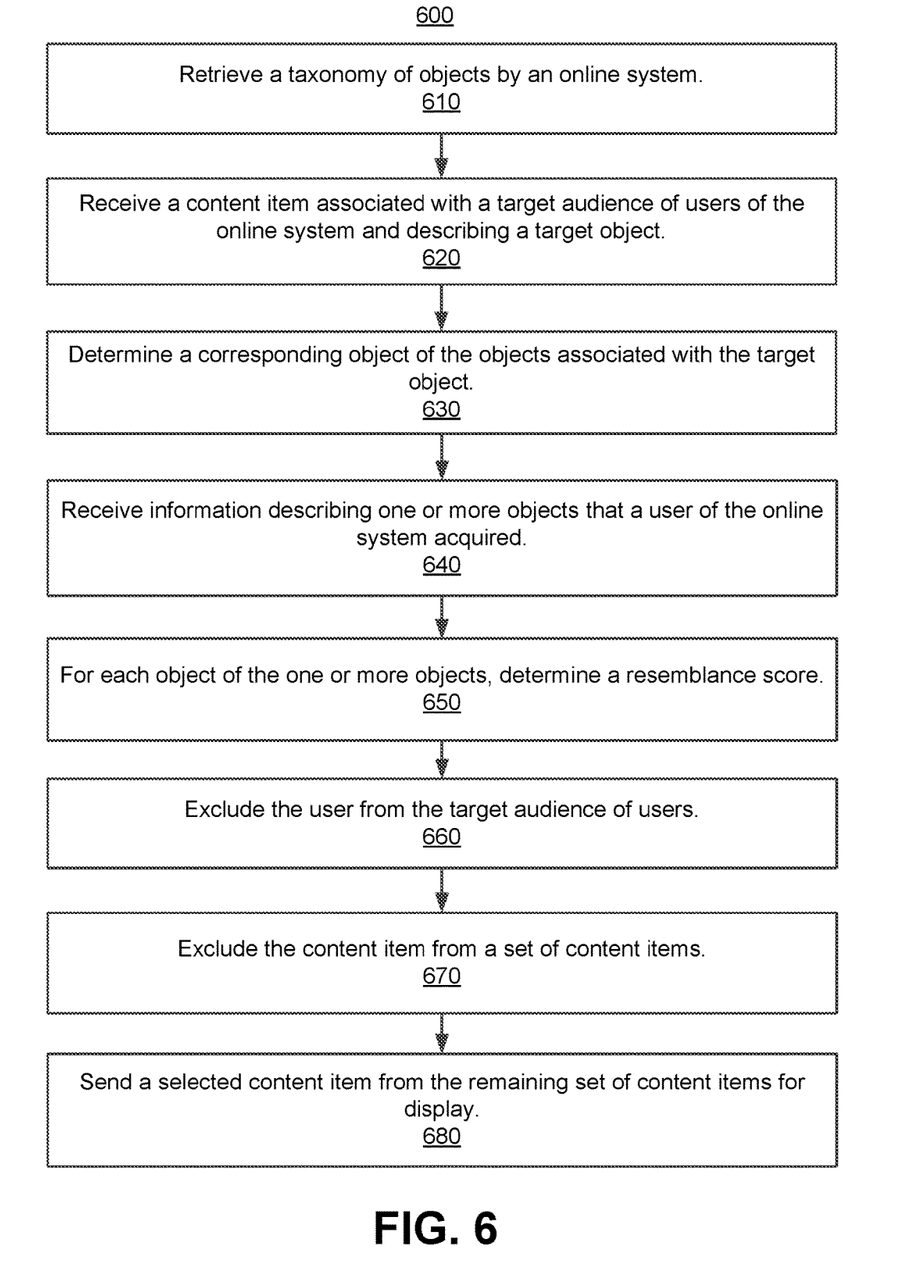
FIG. 6 is a flowchart illustrating a process for filtering content items using a taxonomy of objects according to one embodiment.

FIG. 6 is a flowchart illustrating a process 600 for sending content items based on predicting user actions on an online system according to one embodiment. In some embodiments, the process 600 is used by the online system 100—e.g., modules of the online system 100 described with reference to FIG. 2—within the system environment in FIG. 1. The process 600 may include different or additional steps than those described in conjunction with FIG. 6 in some embodiments or perform steps in different orders than the order described in conjunction with FIG. 6.

In one embodiment, the online system 100 retrieves 610 a taxonomy of a set of objects (e.g., the taxonomy 400 shown in FIG. 4). Each object is associated with a canonical form data structure representing the object. The canonical form data structures include parameters whose values are based on an aggregate dataset of information received from servers outside a domain of the online system 100, e.g., from third party systems 120. The taxonomy classifies the set of objects based on resemblances between different objects. In some embodiments, the taxonomy is a graph data structure with nodes connected by edges. Nodes of objects that are similar to each other are connected to nodes of the same categories or subcategories. The online system 100 receives 620 a content item from a target third party system 120, where the content item is associated with a target audience of users of the online system 100 and describes a target object. The taxonomy engine 270 determines 630 that a corresponding object of the set of objects is associated with the target object based on the canonical form data structure of the corresponding object. The third party tracker 250 receives 640, from a client device 110 of a user of the online system 100, information describing one or more objects that the user acquired via third party systems 120.

For each object of the one or more objects, the score generator 280 determines 650 a resemblance score that indicating a level of resemblance between the object and the corresponding object, e.g., based on the canonical form data structures of the object and the corresponding object. The content generator 290 excludes 660 the user from the target audience of users in response to at least one of the resemblance scores being greater than a threshold value. The content generator 290 excludes 670 the content item from a set of content items in response to the excluding of the user from the target audience of users. The content generator 290 sends 680 a selected content item from the remaining set of content items for display to the user, e.g., on the client device 110. The content item may include a video or image of an object, text describing an object, or a URL to a third party website associated with an object.

In one embodiment, the online system 100 determines users to exclude from a target audience of users in advance of impression opportunities to provide content items. For example, an impression opportunity occurs when a user of the online system 100 is interacting with the online system 100 using a client device 110. The online system 100 can provide a content item for display on the client device 110 that will likely be viewed by the user. Further, by providing the content item, the online system 100 may receive compensation from a third party system 120 associated with the content item. In other embodiments, the online system 100 determines users to exclude from a target audience of users in real-time. For instance, when an impression opportunity occurs, the online system 100 uses the most recent available information to determine which, if any, users to exclude from the target audience. In some embodiments, the online system 100 does not exclude a user from a target audience for content items describing products complementary to a product that the user previously acquired or unrelated to the product that the user previously acquired. For example, if a user acquired a bicycle, the online system 100 may provide content items describing bicycle helmets, gloves, sunglasses, apparel, and tire patching kits, because these additional products are likely to be useful for the user.

In another embodiment, the online system receives information from third party systems 120 describing a set of objects available via one of the third party systems. The machine learning engine 265 applies one or more machine learning models trained using the received information describing the set of objects. Each machine learning model can determine a parameter describing the object, e.g., a canonical object type or an object value. For each of the objects, the canonical form engine 260 generates a data structure representing the object in a canonical form including values for one or more parameters. The taxonomy engine 270 generates a taxonomy indicates resemblances between the objects based on the data structures representing the objects in the canonical form. The taxonomy is represented by a graph data structure. To generate the taxonomy, the taxonomy engine 270 (i) generates a node representing each object, (ii) generates nodes representing categories and subcategories, (iii) connects each node of a subcategory with an edge to a node representing a category, and (iv) connects each node of an object with an edge to one of the nodes or a category or a subcategory. The content generator 290 determines to deliver a content item associated with a particular object to a user of the online system 100 based on the taxonomy.

In one embodiment, to determine whether to deliver a content item associated with a particular object to a user of the online system 100 based on the taxonomy, the online system 100 receives, from a client device 110 of the user, information describing at least one object of the set of objects that the user acquired via a third party system 120. The content generator 290 retrieves a set of content items each associated with one of the objects of the set of objects. The content generator 290 selects a subset of the objects using a filter to exclude one or more objects from the set of objects based on the taxonomy. The score generator 290 determines a resemblance score for each object in the subset based on the corresponding data structures, where the resemblance scores indicate a level of resemblance between the object and the at least one object. The content generator 290 removes a content item from the set of content items, where the removed content item is associated with an object of the subset having a resemblance score greater than a threshold value. The content generator 290 sends a selected content item from the remaining subset for display on the client device 110.

By filtering the taxonomy of objects, the online system 100 may save computational processing time and memory resources required to determine the resemblance scores. In particular, the taxonomy may include nodes of tens of thousands of different objects. Thus, determining resemblance scores for all of the objects each time the user acquired an object would be computationally intensive and not practical for a human to determine manually. However, by filtering the taxonomy, the score generator 280 only needs to determine resemblance scores for a reduced number of objects, e.g., on the scale of tens or hundreds instead of tens of thousands. As the number of required resemblance scores reduces, the computational time required by the content generator 290 to select content items for presentation to the user also decreases. Accordingly, the process 600 improves the efficiency of a computer performing the process 600 compared to conventional techniques for generating scores to indicate similarities between different objects.

VII. Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer program product comprising a non-transitory computer readable storage medium having instructions encoded thereon that, when executed by a processor, cause the processor to:
   retrieve a taxonomy of a plurality of objects by an online system, each object associated with a data structure representing the object in a canonical form, the taxonomy indicating resemblances between the plurality of objects;
   receive a content item from a target third party system, the content item associated with a target audience of users of the online system and describing a target object;
   determine that a corresponding object of the plurality of objects is associated with the target object based on the data structure of the corresponding object;
   receive, from a client device of a user of the online system, information describing one or more objects that the user acquired via a plurality of third party systems;
   for each object of the one or more objects, determine a resemblance score based on the data structure of the object and the data structure of the corresponding object, the resemblance score indicating a level of resemblance between the object and the corresponding object;
   exclude the user from the target audience of users in response to at least one of the resemblance scores being greater than a threshold value;
   exclude the content item from a set of content items in response to the excluding of the user from the target audience of users; and
   send a selected content item from the remaining set of content items for display on the client device.

2. The non-transitory computer readable storage medium of claim 1, wherein each data structure representing the object in the canonical form stores a plurality of parameters including at least a canonical object type, and wherein objects of the plurality of objects with a same canonical object type are associated with each other in the taxonomy.

3. The non-transitory computer readable storage medium of claim 1, having further instructions that when executed by the processor cause the processor to:
   receive information indicating that the user closed a previously displayed content item describing a candidate object; and
   exclude another content item from the remaining set of content items, the another content item describing the candidate object.

4. The non-transitory computer readable storage medium of claim 1, wherein the taxonomy is represented by a graph data structure including a plurality of nodes connected by edges, each of the plurality of objects represented by one of the nodes, and having further instructions that when executed by the processor cause the processor to:
   for each node representing one of the objects, connect the node with an edge to a node representing a category that is associated with the object represented by the node.

5. The non-transitory computer readable storage medium of claim 4, having further instructions that when executed by the processor cause the processor to connect a plurality of nodes each representing a subcategory with an edge to a node representing the category.

6. A method comprising:
   retrieving a taxonomy of a plurality of objects by an online system, each object associated with a data structure representing the object in a canonical form, the taxonomy indicating resemblances between the plurality of objects;
   receiving a content item from a target third party system, the content item associated with a target audience of users of the online system and describing a target object;
   determining that a corresponding object of the plurality of objects is associated with the target object based on the data structure of the corresponding object;
   receiving, from a client device of a user of the online system, information describing one or more objects that the user acquired via a plurality of third party systems;
   for each object of the one or more objects, determining a resemblance score based on the data structure of the object and the data structure of the corresponding object, the resemblance score indicating a level of resemblance between the object and the corresponding object;
   excluding the user from the target audience of users in response to at least one of the resemblance scores being greater than a threshold value;
   excluding the content item from a set of content items in response to the excluding of the user from the target audience of users; and
   sending a selected content item from the remaining set of content items for display on the client device.

7. The method of claim 6, wherein each data structure representing the object in the canonical form stores a plurality of parameters including at least a canonical object type, and wherein objects of the plurality of objects with a same canonical object type are associated with each other in the taxonomy.

8. The method of claim 7, wherein the plurality of parameters further includes an amount of compensation that the user must provide to a third party system corresponding to the selected content item to acquire an object described by the selected content item.

9. The method of claim 7, wherein the corresponding object is a physical object, and wherein the plurality of parameters further includes a physical size or color of the physical object.

10. The method of claim 7, wherein the plurality of parameters further includes an average rate at which users of the online system acquire the corresponding object.

11. The method of claim 6, further comprising:
   receiving information indicating that the user closed a previously displayed content item describing a candidate object; and
   excluding another content item from the remaining set of content items, the another content item describing the candidate object.

12. The method of claim 6, wherein the selected content item (i) describes a candidate object and (ii) includes one or more of: an image of one of the candidate object, a video of the candidate object, a description of the candidate object, or a URL to a web page associated with the candidate object.

13. The method of claim 6, wherein the taxonomy is represented by a graph data structure including a plurality of nodes connected by edges, each of the plurality of objects represented by one of the nodes, and wherein the method further comprises:

for each node representing one of the objects, connecting the node with an edge to a node representing a category that is associated with the object represented by the node.

14. The method of claim 13, further comprising connecting a plurality of nodes each representing a subcategory with an edge to a node representing the category.

15. A method comprising:

receiving information describing a plurality of objects by an online system from a plurality of third party systems, each object available to be acquired by users of the online system via one of the third party systems;

applying one or more machine learning models trained using the received information describing the plurality of objects, each of the one or more machine learning models configured to determine a parameter describing an object, the parameter being one of a canonical object type or an object value;

generating, for each of the objects, a data structure representing the object in a canonical form and including values for one or more parameters;

generating a taxonomy indicating resemblances between the plurality of objects based on the data structures representing the objects in the canonical form, the taxonomy represented by a graph data structure, and wherein generating the taxonomy comprises:

generating, for each of the objects, a node representing the object;

generating a plurality of nodes representing a plurality of categories and a plurality of subcategories;

connecting each node representing one of the subcategories with an edge to one of the nodes representing one of the categories; and connecting each node representing one of the objects with an edge to one of the nodes representing one of the plurality of categories or one of the plurality of subcategories; and determining whether to deliver a content item associated with a particular object to a user of the online system based on the taxonomy.

16. The method of claim 15, wherein determining whether to deliver the content item associated with the particular object to the user based on the taxonomy comprises:

receiving, from a client device of the user, information describing at least one object of the plurality of objects that the user acquired via one of the third party systems;

retrieving a plurality of content items each associated with one of the objects of the plurality of objects;

selecting a subset of the plurality of objects by using a filter to exclude one or more objects from the plurality of objects based on the taxonomy;

for each object of the subset, determining a resemblance score based on the data structure of the object and the data structure of the at least one object, the resemblance score indicating a level of resemblance between the object and the at least one object;

removing a content item from the plurality of content items, wherein the content item is associated with an object of the subset having a resemblance score greater than a threshold value; and sending a selected content item from the remaining subset for display on the client device.

17. The method of claim 16, wherein the selected content item includes one or more of: an image of one of the objects, a video of one of the objects, a description of one of the objects, or a URL to a web page associated with one of the objects.

18. The method of claim 16, further comprising:

receiving information indicating that the user closed a previously displayed content item describing a candidate object; and removing another content item from the plurality of content items, the another content item describing the candidate object.

19. The method of claim 15, wherein the object value indicates an amount of compensation that a user of the online system must provide to a third party system to acquire the corresponding object.

20. The method of claim 15, wherein the plurality of parameters further includes an average rate at which the users of the online system acquire the at least one object.

* * * * *